(12) United States Patent
Fowler et al.

(10) Patent No.: US 9,599,285 B2
(45) Date of Patent: Mar. 21, 2017

(54) METHOD AND APPARATUS FOR CONTROLLING GAS FLOW FROM CYLINDERS

(71) Applicants: Zachary Fowler, Kenmore, NY (US); Stephan Gamard, Clarence, NY (US); Murat Gunay, Niagara Falls (CA); Paul Oetinger, Gasport, NY (US)

(72) Inventors: Zachary Fowler, Kenmore, NY (US); Stephan Gamard, Clarence, NY (US); Murat Gunay, Niagara Falls (CA); Paul Oetinger, Gasport, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 14/987,840

(22) Filed: Jan. 5, 2016

(65) Prior Publication Data
US 2016/0116114 A1 Apr. 28, 2016

Related U.S. Application Data

(63) Continuation of application No. 14/053,698, filed on Oct. 15, 2013, now Pat. No. 9,273,799.
(Continued)

(51) Int. Cl.
*F16K 37/00* (2006.01)
*F17C 13/00* (2006.01)

(52) U.S. Cl.
CPC .......... *F17C 13/002* (2013.01); *F16K 37/005* (2013.01); *F17C 13/004* (2013.01); *F17C 2201/058* (2013.01); *F17C 2205/0165* (2013.01); *F17C 2205/0308* (2013.01); *F17C 2205/0329* (2013.01); *F17C 2205/0332* (2013.01); *F17C 2205/0385* (2013.01); *F17C 2205/0394* (2013.01); *F17C 2221/011* (2013.01); *F17C 2221/014* (2013.01); *F17C 2221/017* (2013.01); *F17C 2221/03* (2013.01); *F17C 2223/01* (2013.01); *F17C 2223/0123* (2013.01); *F17C 2223/036* (2013.01); *F17C 2250/032* (2013.01); *F17C 2250/034* (2013.01); *F17C 2250/036* (2013.01); *F17C 2250/043* (2013.01); *F17C 2250/0443* (2013.01); *F17C 2250/0491* (2013.01); *F17C 2250/0495* (2013.01); *F17C 2250/077* (2013.01); *F17C 2270/02* (2013.01); *Y10T 137/0318* (2015.04); *Y10T 137/8326* (2015.04)

(58) Field of Classification Search
CPC ...................... F16K 37/005; F17C 2250/0478
USPC .................................................. 137/552, 557
See application file for complete search history.

(56) References Cited

U.S. PATENT DOCUMENTS 5,001,685 A 3/1991 Hayakawa
5,196,781 A 3/1993 Jamieson et al.
(Continued)

FOREIGN PATENT DOCUMENTS

EP 1890213 2/2008
WO WO 2005/093377 10/2005

*Primary Examiner* — Kevin Murphy
*Assistant Examiner* — Angelisa L Hicks
(74) *Attorney, Agent, or Firm* — Robert J. Hampsch

(57) ABSTRACT

A device that can be attached to the outlet of a gas cylinder, which can monitor and display in digital or analog form the pressure of the gas in the cylinder and the interval of time remaining until the amount of gas in the cylinder will reach a predetermined lower threshold at a given flow.

7 Claims, 3 Drawing Sheets

Related U.S. Application Data

(60) Provisional application No. 61/724,588, filed on Nov. 9, 2012.

(56) References Cited

U.S. PATENT DOCUMENTS

| | | |
|---|---|---|
| 5,409,037 A | 4/1995 | Wheeler et al. |
| 5,482,405 A | 1/1996 | Tolksdorf et al. |
| 6,137,417 A | 10/2000 | McDermott |
| 6,820,647 B1 | 11/2004 | Grecco et al. |
| 7,114,510 B2 | 10/2006 | Peters et al. |
| 7,228,743 B2 | 6/2007 | Weiss |
| 8,047,079 B2 | 11/2011 | Bleys et al. |
| 8,291,904 B2 | 10/2012 | Bathe et al. |
| 8,359,171 B2 | 1/2013 | Bleys et al. |
| 2003/0189492 A1 | 10/2003 | Harvie |
| 2006/0272710 A1 | 12/2006 | Minervini et al. |
| 2007/0062585 A1 | 3/2007 | Gamard et al. |
| 2008/0110925 A1 | 5/2008 | Hagstrom et al. |
| 2008/0150739 A1 | 6/2008 | Gamard |
| 2009/0050218 A1 | 2/2009 | Burgess et al. |
| 2011/0088794 A1* | 4/2011 | Cavagna ................ F23K 5/007 137/557 |
| 2012/0080103 A1 | 4/2012 | Levine et al. |

\* cited by examiner

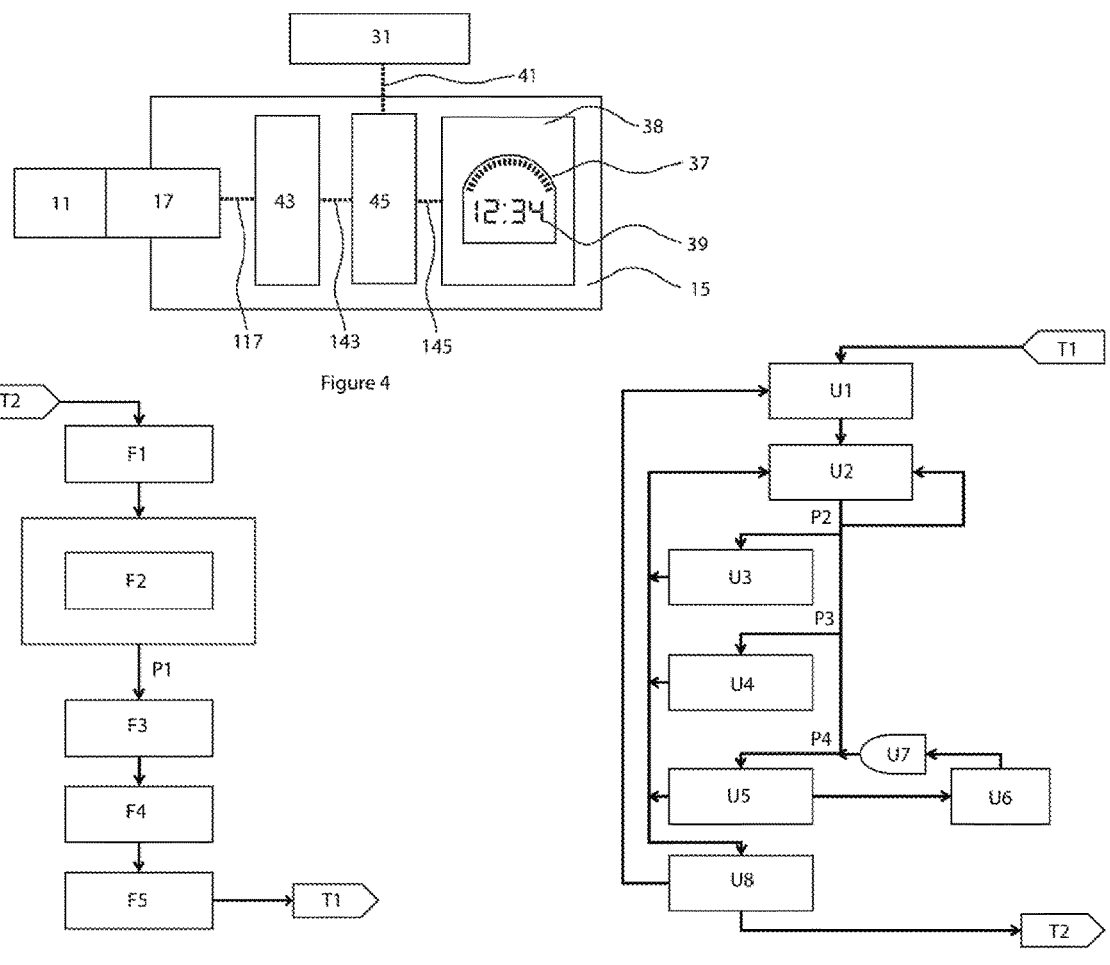

METHOD AND APPARATUS FOR CONTROLLING GAS FLOW FROM CYLINDERS

CROSS REFERENCE TO RELATED APPLICATIONS

The present application is a continuation application and claims the benefit of and priority to U.S. patent application Ser. No. 14/053,698 filed on Oct. 15, 2013; which, in turn claims priority from U.S. Provisional Application Ser. No. 61/724,588, filed Nov. 9, 2012.

FIELD OF THE INVENTION

The present invention relates to apparatus and methods for monitoring the amount of gas in a cylinder or similar container.

BACKGROUND

Gas cylinders are widely used in medical and industrial settings for the dispensing of gases and mixtures of gases such as oxygen, nitrogen, helium, nitrous oxide, heliox, etc. While often cylinders included a visible means to indicate current cylinder contents with either mechanical or electronic manometers, the information is not transmitted to users as it relates to the current usage situation and often requires further processing of the information by the user to produce useful information. In the medical setting, the determination of time remaining relative to the current use rate of the gas cylinder is performed from tables and charts that are not always readily accessible leading to the non-continuous monitoring of patients and reduced patient safety. In industrial settings, cylinders are often used to provide calibration gases for critical process equipment where calibrations take extended periods of time with operators often stepping away to conduct other activities. An objective of the present invention is to alleviate some or all of the challenges in linking the use state of gas cylinders to the relevant information the user requires from the cylinder.

SUMMARY OF THE INVENTION

One aspect of the present invention is a device for controlling the flow of gas from a gas container, comprising: (A) a device having a gas flow passageway therethrough which has an inlet and an outlet, wherein the device is configured to be sealingly attached to a gas container to receive gas from the gas container into said inlet; (B) gas flow control comprising a valve in said passageway capable of controllably closing or opening the passageway to the flow of gas therethrough, and a manually operable selector exterior to said device and operatively connected to said valve to enable adjustment of the position of said valve to a closed position and to one or more open positions by movement of said selector; (C) a pressure sensor capable of detecting the pressure of gas in a container when the device is sealingly attached to said container and of generating an electronic signal corresponding to the detected pressure; and (D)electronic control connected to said pressure sensor, which is (1) capable of detecting the position setting of said valve, and is (2) capable of repeatedly at periodic predetermined time frequencies (i) detecting from said pressure sensor the pressure of gas in said container, and (ii) calculating as a function of said detected position setting and said repeatedly detected periodic pressures the interval of time remaining until the amount of gas in the container will reach a first predetermined threshold, and is (3) capable of generating an alarm signal to actuate an alarm when the amount of gas in the container reaches a preset threshold which is the same as or higher than said first predetermined threshold.

A further aspect of the invention is a device for controlling the flow of gas from a gas container, comprising: (A) a gas flow passageway through said device and having an inlet and an outlet, wherein the inlet is configured to be sealingly attached to a gas container to receive gas from the gas container; (B) gas flow control comprising a valve in said passageway capable of controllably closing or opening the passageway to the flow of gas therethrough, and a manually operable selector exterior to said device and operatively connected to said valve to enable adjustment of the position of said valve to a closed position and one or more open positions by movement of said selector; (C) a pressure sensor capable of detecting the pressure of gas in a container when the device is sealingly attached to said container and of generating an electronic signal corresponding to the detected pressure; (D) an electronic display capable of displaying information in digital and/or analog form; (E) an electronic alarm capable of being actuated to signify the presence of an alarm state audibly, visibly, or both audibly and visibly; and (F)electronic control connected to said gas flow control, said pressure sensor, said display, and said alarm, which is capable of detecting the position setting of said valve, detecting from said pressure sensor at periodic predetermined time frequencies the pressure of gas in said container, calculating as a function of said detected position setting and said detected periodic pressures the interval of time remaining until the amount of gas in the container will reach a predetermined lower threshold, generating a signal causing said display to display said interval, and generating a signal actuating said alarm when the amount of gas in the container reaches said threshold.

Another embodiment of the invention is a device for controlling the flow of gas from a gas container, comprising: (A) a gas flow passageway through said device and having an inlet and an outlet, wherein the inlet is configured to be sealingly attached to a gas container to receive gas from the gas container; (B) gas flow control comprising a valve in said passageway capable of controllably closing or opening the passageway to the flow of gas therethrough, and a manually operable selector exterior to said device and operatively connected to said valve to enable adjustment of the position of said valve to a closed position and one or more open positions by movement of said selector; (C) a pressure sensor capable of detecting the pressure of gas in a container when the device is sealingly attached to said container and of generating an electronic signal corresponding to the detected pressure; and (D) an electronic alarm capable of being actuated to signify the presence of an alarm state audibly, visibly, or both audibly and visibly.

Other aspects of the present invention include a method for controlling the flow of gas from a gas container, comprising: (A) providing a gas container having at an outlet thereof a controller that includes a gas flow control comprising a valve capable of controllably closing or opening the flow of gas out of said container and into, through, and out of said controller; (B)detecting the position setting of said valve; (C) repeatedly, at periodic predetermined time frequencies, (i) detecting the pressure of gas in said container, and (ii) calculating as a function of said detected position setting and said repeatedly detected periodic pressures the interval of time remaining until the amount of gas in the container will reach a preset value, and (D) when the interval reaches a first predetermined threshold, wherein said first predetermined threshold is the same as or higher than said preset value, generating an alarm signal which is capable of actuating an alarm.

Yet another aspect of the invention is a method for controlling the flow of gas from a gas container, comprising: (A) providing a gas container having at an outlet thereof a controller that includes a gas flow control comprising a valve capable of controllably closing or opening the flow of gas out of said container; (B) detecting the position setting of said valve; (C) repeatedly, at periodic predetermined time frequencies, (i) detecting the pressure of gas in said container, (ii) calculating as a function of said detected position setting and said detected periodic pressures the interval of time remaining until the amount of gas in the container will reach a predetermined lower threshold, and (iii) causing a display to display said interval; and (D) actuating an alarm when the amount of gas in the container reaches said threshold.

In preferred embodiments the invention is carried out with a device having a display and one or more alarms provided integrally with the device and electronically connected to an electronic controller in the device to receive the display signals and alarm signals.

In other preferred embodiments, the device and method include the capability that after the generating of an alarm signal begins, the alarm signal can be manually deactivated and the device continues to determine a time remaining until a second alarm state is reached at which point an alarm signal is generated.

In one aspect the invention may be characterized as a gas cylinder valve and cap with integrated pressure and flow regulator (all-in-one valve) and cylinder alarming system comprising at least the following components: a user-operated device with single-knob operation that by means of opening and closing the inlet of the all-in-one valve from the cylinder supplies a calibrated flow from an outlet; a dedicated electronic manometer that is threaded into the all-in-one valve; and a protective cap which contains and protects the all-in-one valve, electronic manometer and an electronic component circuit board. The electronic manometer thus comprises at least: apparatus that measures the cylinder pressure through a sensor; a data processing unit within the manometer housing capable of acquiring, storing, processing the data and operatively coupled to transmit the data to the user; and where the electronic component circuit board is composed of a means: to processing data; to send an output to the manometer indicating the all-in-one valve has been opened or closed; to send data to the electronic manometer from the user; and to output an audible indication from the manometer.

The invention may also be characterized as a method for controlling and monitoring a medical gas cylinder through a gas cylinder valve and electronics that comprises the steps of: adjustment of the flow through by an all-in-one valve attached to the cylinder; transmitting an opening or closing of the valve to the electronic manometer by an electronic component circuit board; using a data processing unit in the electronic manometer to calculate the duration of time remaining until the pressure within the gas cylinder reaches a prescribed threshold from data collected by a pressure sensor; transmitting the time remaining to the user; and transmitting a signal to an electronic component circuit board to output an audible indication of the cylinder nearing or reaching the prescribed threshold. The user can also transmit through the electronic component circuit board a means to delay the audible indication.

BRIEF DESCRIPTION OF THE DRAWINGS

FIG. 4 is a schematic view of components of an embodiment of the present invention showing their relative connections to one another.

FIG. 5 is a schematic view or flow chart of operations that can be carried out by a user of an embodiment of a device according to the present invention when the device is operatively attached to a container following exhaustion of gas from the container, to replenish the supply of gas in the container.

FIG. 6 is a schematic view or flow chart of operations that can be carried out by a user of an embodiment of a device according to the present invention when the device is operatively attached to a container of gas to be dispensed from the container.

DETAILED DESCRIPTION

Figure 1:
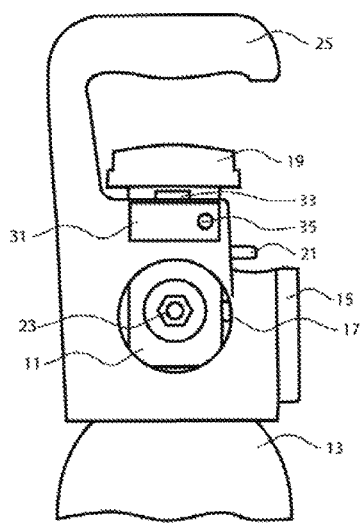
FIG. 1 is a side plan view of the left side of an embodiment of the device of the present invention, as attached to the top of a gas cylinder, together with a shroud that encloses the device.
Figure 3:
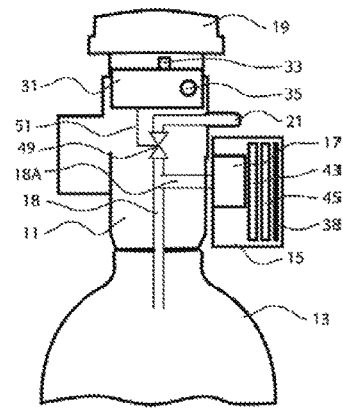
FIG. 3 is a cross-sectional view of the embodiment and view of FIG. 1, without the shroud.

Turning to FIG. 1, there is shown device 11 which is an embodiment of the present invention, connected to a gas container such as a conventional gas cylinder 13. Device 11 when in use is attached to cylinder 13 to create a seal that does not permit gas to pass through the connection, such as by being threaded into a mating threaded opening in cylinder 13. Device 11 includes electronic manometer 15 which includes pressure sensor component 17 as described below (FIG. 3). Tube 18A connects pressure sensor component 17 to the interior of cylinder 13, as seen in FIG. 3.

Single-knob selector 19 attached to device 11 permits the control of gas release from the cylinder 13 through the device to outlet 21, by the user selecting a desired flow rate and turning selector 19 to a position that corresponds to the desired flow rate. Selector 19 also has a position at which flow of gas through and out of device 11 is closed off. Preferably, selector 19 is rotatable about a vertical axis. The cylinder can be filled with gas to be dispensed through a valve at fill port 23 that can be controllably opened and closed.

Surrounding device 11 and attached thereto is optional cap 25, preferably comprising a protective shroud integral with a handle that can be easily gripped by the user to carry the cylinder 13 while also protecting the device 11 against damage in the event the cylinder is dropped or falls over. Cap 25 can be manufactured of metal or sturdy plastic. Cap 25 can be of any ergonomic or aesthetic configuration which is useful in marketing of the associated equipment while also being sufficient to protect the components of the device 11.

An electronic control panel 31 is either permanently affixed to the device 11 or to cap 25, or detachable therefrom. The panel 31 comprises electronic controls that receive, store, process and generate signals as described further herein. Board 31 preferably includes a mechanical interface, including switch 33, to indicate to the electronic control for the device the position of the selector 19 (and thus whether the device is closed to flow of gas or open for flow of gas, as described hereinbelow). Preferably, device 11 also contains a manually operable input device, such as button 35 on panel 31 or elsewhere, to allow a user to interact with the device's activation of an alarm as described further hereinbelow.

Figure 2:
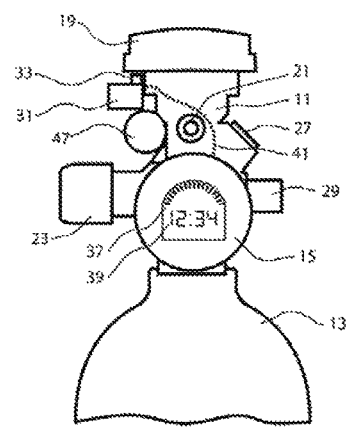
FIG. 2 is a front plan view of the embodiment shown in FIG. 1 of the device of the present invention, without the shroud.

Turning to FIG. 2, there is shown the embodiment of FIG. 1 in which cylinder 13 has been turned a quarter of a circle, so that electronic manometer 15 is seen from its front rather than from its side as seen in FIG. 1. In addition, in FIG. 2 the protective cap 25 seen in FIG. 1 has been removed to permit better viewing of components in the device 11. The valve fill port 23 is covered by a cap in this view. In the view of FIG. 2, outlet 21 is seen as well as pressure relief safety valve 27 and optional auxiliary outlet 29, both of which are normally closed. The view of FIG. 2 also shows the device 11 attached to the gas cylinder 13. Electronic manometer 15 preferably includes display 38 having indicia on its face enabling electronic display of information in one or both of graphical format 37 and/or numerical format 39. Electronic manometer 15 is connected to panel 31 by cable 41 to allow information to pass between these two components. Selector 19 and 33 are also visible, as is battery 47 which provides electrical power to the electronic controls by appropriate connections.

Turning to FIG. 3, the gas path and additional components of device 11 can be seen directly in the cross sectional view. In this view, the protective cap 25 seen in FIG. 1 has been removed to better illustrate the connectivity of different elements in the device. The electronic manometer 15 houses a data processing unit 43, a data transmitting unit 45, and the electronic display 38. The data processing unit 43, a data transmitting unit 45, or the electronic display 38 can be combined in any combination useful to carrying out the methods described herein. The electronic manometer 15 is shown including pressure sensor component 17 that is attached, for example threaded into, leg 18A of tube 18. Tube 18 is open to the gas in cylinder 13. Leg 18A of tube 18 is attached to pressure sensor component 17 so that pressure sensor component 17 is exposed to the gas at its pressure within cylinder 13.

Device 11 also includes a valve or valve system, represented as 49 in FIG. 3, which controls whether or not gas can flow through tube 18 to outlet 21. That is, valve 49 can be closed to gas flow or can be open to one or more open positions permitting gas to flow. Valve 49 is connected to selector 19, preferably by a valve stem represented as 51 in FIG. 3 or equivalent connection, so that movement of selector 19 moves valve 49 between a closed position and one or more open positions.

FIG. 4 illustrates schematically the components of the electronic manometer 15 along with the manner in which other components of the device of the present invention can be operatively interconnected. The electronic manometer 15 includes pressure sensor component 17 that is attached to device 11 as described above. Pressure sensor component 17 is connected via suitable electrical connection 117 to a data processing unit 43 which is in turn connected via suitable electrical connection 143 to a data transmitting unit 45. The data transmitting unit 45 can pass a signal (information) electrically through cable 41 to the panel 31 and/or through suitable electrical connection 145 to display 38, such as on the face of electronic manometer 15, where it can indicate either graphical information 37 or numerical information 39, or both. Any useful information can be displayed, such as: the pressure of gas in the cylinder, the amount of gas remaining in the cylinder, the time remaining until the amount of gas remaining in the cylinder is low enough to reach a predetermined threshold value (or to be completely exhausted from the cylinder), the status (including alarm status) of the cylinder, or other desired information about the status of the unit. The format of the display can take the form of a symbol that comes on or flashes, an analog scale (like the gas gauge in an automobile) and/or a digital display, or other formats. The display can be activated so that different items of information appear together, or alternatingly (i.e. with one item appearing, then a second item, then the first again, and so on).

In the embodiment illustrated in FIG. 1 and FIG. 2 and FIG. 3 and FIG. 4, the user selects an operating flow rate by moving the single-knob selector 19 to a position which opens valve 49 to permit gas to flow out of the cylinder through the device 11. The position to which the selector 19 is moved engages switch 33 which engagement is recognized by the electronic control on panel 31. The electronic control on panel 31 then transmits a signal to the data transmitting unit 45, which signal is transferred to the data processing unit 43 within the electronic manometer 15, that the user has initiated gas flow by opening valve 49 of the device 11. The electronic manometer including pressure sensor component 17 detects the pressure of gas in the cylinder, converts that detected pressure to an electronic signal corresponding to the detected pressure, and passes that signal to the data processing unit 43.

Figure 7:
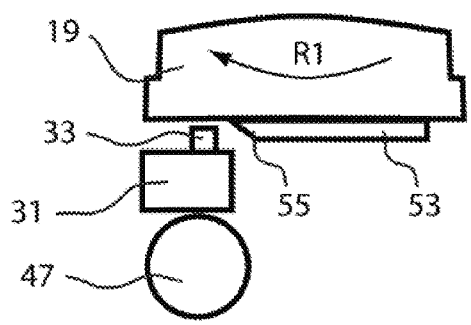
FIG. 7 is an enlarged front plan view of the top portion of an embodiment of the invention, showing the device in the "off" position.
Figure 8:
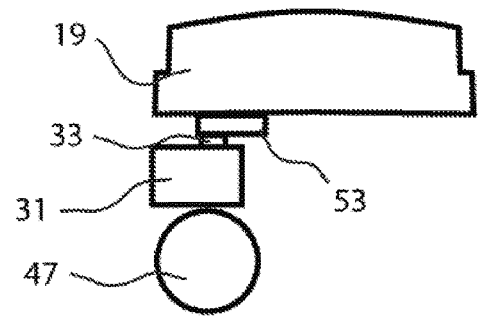
FIG. 8 is an enlarged front plan view of the embodiment of FIG. 7, showing the device in the "on" position.

Turning to FIG. 7 and FIG. 8, a preferred mode of the operation of selector 19 is shown where rotation of selector 19 can be sensed via switch 33. In this embodiment, selector 19 includes depending projection 53 having a tapered shoulder 55. Rotation of selector 19 in direction R1 causes shoulder 55 and projection 53 to engage switch 33, which is activated by being pressed downward in this case.

Figure 9:
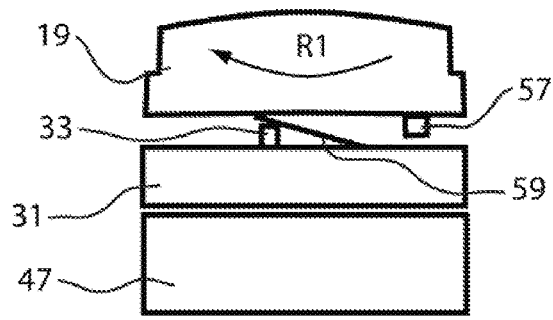
FIG. 9 is an enlarged front plan view of the top portion of another embodiment of the invention, showing the device in the "off" position.
Figure 10:
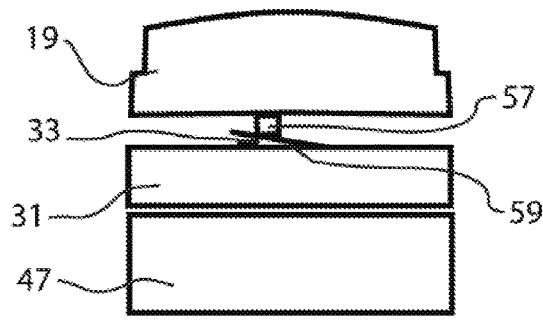
FIG. 10 is an enlarged front plan view of the embodiment of FIG. 9, showing the device in the "on" position.

FIG. 9 and FIG. 10 show an alternative embodiment for activation of switch 33 by selector 19, in which rotation of selector in direction R1 causes a projection 57 under selector 19 to engage leaf spring 59 affixed to device 11, and leaf spring 59 is urged downward to depress switch 33 and thereby activate or close switch 33. The switch can be selected such the system is enabled to sense that the single-knob selector 19 has been turned to allow flow of gas, or refined such that the degree of rotation of the single-knob selector 19 can be determined. In either case, the rotation of the selector 19 is such that it can: move off the switch, move onto the switch, open switch contacts, close switch contacts, or any combination therein of Data processing unit 43 conducts a calculation of time remaining, or other user specific information, to then be passed back to the data transmitting unit 45. For instance, "time remaining" means the interval of time remaining, calculated based on the flow rate of the gas from the cylinder that corresponds to the flow rate setting of the selector 19 and the detected pressure in the cylinder, until the amount of gas remaining in the cylinder has reached a threshold value at which the user should be notified that only a limited amount of time remains before the cylinder's contents of the gas will have been exhausted. Thus, the device of the present invention operates not on the basis of a preset limiting pressure, but on the basis of a preset time threshold which in turn is a function of the flow rate of the gas. That is, the device and method of the present invention do not depend on pre-established reference pressure values. In this way, greater operational flexibility and adaptability are provided, in being able to accommodate a variety of pressures and flow rates and the changing of the pressure within the cylinder as the contents pass out of the cylinder.

Based on the type of user specific information passed to the data transmitting unit 45, the device then gives an indication of the device's use state to the user by any one or more of the following: displaying graphical information 37 on the electronic display 38; displaying numerical information 39 on the electronic display 38; or passing a signal to an alarm.

The device's electronic control is preprogrammed to receive pressure readings from the electronic manometer 15 at preprogrammed intervals of time and to compute, based on the pressure readings and on the preprogrammed flow rate that corresponds to the position setting of the selector that is detected by the electronic control via switch 33, the time remaining until exhaustion of gas from the cylinder. Alternatively, it could compute the time remaining until the time remaining to complete exhaustion has reached a preset value. In one exemplary embodiment, pressure readings are received once a minute (by taking one reading per minute, or by taking several readings within one second at points one minute apart and averaging those readings) and the change in pressure over the one-minute period is used together with the detected or preprogrammed flow rate to determine a new time remaining value. The gas pressure within the cylinder can be measured more often, such as every second, for e.g. purposes of displaying this information, without necessarily computing time-remaining values on pressure readings detected that often.

The electronic control generates signals that can be communicated to a display which desires the desired information such as time remaining and/or pressure. Preferably, the display is integral with the device and electrically connected to the other components, but it should be appreciated that the display signal(s) representing information to be displayed can be transmitted to a display that is remote from the device 11, by wire or wirelessly, such as to a receiver carried by a remote user or health care professional.

The device's electronic control is preprogrammed to generate an alarm signal that is capable of actuating an alarm when an alarm state has been attained. The preferred alarm state is that the amount of time remaining in which gas can flow from the cylinder before the gas is exhausted from the cylinder, first reaches or first passes lower than a certain preprogrammed threshold value. The electronic control determines a time remaining value as described herein, and when that value has reached the threshold value then an alarm signal is actuated.

The device 11 preferably also includes one or more components, also referred to as alarms, that when actuated call the user's attention to the state of the cylinder or the state of the gas supply in the cylinder. One such state is that the amount of gas remaining in the cylinder has been depleted to an amount such that only a short period of time remains before the gas will be completely exhausted from the cylinder. Suitable alarms include a component on panel 31 or elsewhere on device 11 and electrically connected to the alarm that emits an audible sound (whether continuously or intermittently repeating, i.e. beeping); a component that causes a visible sign, such as a light that comes on or flashes intermittently (such as a light-emitting diode on panel 31, on display 38, or elsewhere on the device), or causing display 38 to blink, or an additional symbol appearing or flashing on the display 38. It should also be recognized that the alarm signal can be transmitted to an alarm that is remote from the device 11, by wire or wirelessly, such as to a receiver carried by a remote user or health care professional.

Preferably, device 11 also includes controls by which a user can manually deactivate an alarm that has been actuated, whereupon the electronic control continues to detect the pressure of gas in the cylinder and continues to compute time remaining values, and when the electronic control determines that the time remaining value first equals or is lower than a second predetermined threshold value, the alarm signal is again actuated. For instance, an alarm signal could be generated the first time when the time remaining is 30 minutes, and a second time when the time remaining reaches 15 minutes. The alarm that is actuated this second time can be the same as the first alarm, or it can be different—for instance, different in type (i.e. audible versus visible), and/or different in degree (e.g. continuous sound in place of intermittent sounds, or louder). The device 11 can optionally further include controls that enable a user to deactuate a second alarm signal, whereupon the electronic control actuates an alarm signal a third time upon the time remaining value attaining a third preprogrammed value.

Turning to FIG. 5 and FIG. 6, the manufacturer and user task flow paths (respectively) for use of the invention are shown as a network of interconnected paths. FIG. 5 shows the path consisting of operations F1, F2, F3, F4, and F5 that the manufacturer or gas supplier or refiller may take with the device. FIG. 6 shows the various paths of user actions (U1 through U8) expected to be conducted with the device during the administering of gases. The electronic logic of the data processing unit 43 acts to coordinate the flow of information between the different elements of the device as well as determine the next information to be displayed for user actions.

Transport of the device from the user's facility to the manufacturer T2 is carried out with the device in a passive use state. As the process map in FIG. 5 shows, the device is then prepared for filling the cylinder, step F1, through the fill port 23 by connection to the filling system (not pictured) by plant operators. To avoid unnecessary audible alarms the operators carry out step F2 wherein the panel 31 and single-knob selector 19 are used in a specified combination to send signals to the data transmission unit 45, which are interpreted by the data processing unit 43, to inactivate any audible alarm for the cylinder filling operations, P1. This process allows the device state to go from an active use state into a passive alarm state. The filling operators then empty the cylinder, F3. On refilling the cylinder to the use pressure, the alarm is reactivated, F4, when the data processing unit 43 determines the device is in a cylinder recharging state, by a rise in cylinder pressure above a predetermined threshold. Once the cylinder is filled, a final device check and inspection can be performed, F5, before the device is transported back to a user facility, T1.

Transport of the filled device from the manufacturer to the user's facility, T1, is carried out with the device in a passive use state. Users begin administration of the cylinder contents to a patient, step U1, through a rotation of the single-knob selector 19 which is detected, and is interpreted by the data processing unit 43 as that the device has entered an active use state. The data processing unit 43 uses the position of the selector 19 (identified for instance by switch 33) and periodic pressure measurements obtained from the pressure sensor component 17 to carry out a calculation of user specific information to generate display signal(s) and transmission of information to the user, step U2. The calculation can be simply the conversion of voltage or electrical current to pressure units, more complex calculations using time based data to identify the remaining time before the cylinder's contents become exhausted, or comparisons of input or calculated information to pre-programmed threshold limits. Calculations of remaining time require the additional information of a lower threshold limit.

Threshold values, including lower threshold limits, are fixed pre-programmed values based on the regional, customer or cylinder gas requirements. The data processing unit 43 carries out comparisons of the current device state, including selector position, pressure readings, and/or time remaining, to other intermediate limits (P2, P3, or P4) at which time the device enters a different operating state, such as an alert or alarm state, based on attaining preprogrammed intermediate limit requirements.

In the present invention, intermediate limits P2 and P3 put the system into similar but independent alert states with U3 corresponding to a lower priority state than U4. If a higher threshold limit P4 is reached, the device enters an active alarm state represented by U5. All alert or alarm states include updating the transmitted user information for generating and actuating signals for display and for issuing of auditory and visual indication through panel 31. Alert and alarm states can be distinguished by different visual indications on the electronic display 38 or different audible indications by the panel 31.

General monitoring of the device for user actions is carried out in all states to either sense the (i) inactivation of the device through a rotation of the single-knob selector to a position indicating that the valve is closed, step U8; or (ii) signal the device to enter a passive use state, input P3, via the panel 31 resulting in the device removing the audible indication of alarm. If any limit threshold limit fails to be reached, the device remains in the current active use state while updating the transmitted user information to the electronic manometer 15 for display and actively monitors for a change in state, step U2. During the passive use state, the data processing unit 43 causes the display 38 to display user specific information gathered from the pressure sensing component 17 to update numerical information 39.

What is claimed is:

1. A device for controlling the flow of a gas from a gas container, comprising:
   a gas flow passageway through the device and having an inlet and an outlet, wherein the inlet is configured to be sealingly attached to the gas container to receive the gas from the gas container;
   a gas flow valve disposed in the passageway and capable of controllably closing or opening the passageway to the flow of gas therethrough;
   a manually operable selector operatively connected to the valve to enable adjustment of the position of the valve to a closed position and one or more open positions by movement of the selector;
   a pressure sensor capable of detecting the pressure of the gas in the gas container when the device is sealingly attached to the container and further capable of generating an electronic signal corresponding to the detected pressure;
   an electronic display capable of displaying information in digital and/or analog form;
   an electronic alarm capable of being actuated to signify the presence of an alarm state audibly, visibly, or both audibly and visibly during the administering of the gas from the gas container; and
   an electronic control connected to the gas flow control, the pressure sensor, the electronic display, and the electronic alarm, the electronic control configured to detect the position setting of the valve, detect from the pressure sensor at periodic predetermined time frequencies the pressure of the gas in the gas container;
   the electronic control configured to determine whether the device is in an active use state or a passive use state based on the position setting of the valve and the pressure of the gas in the gas container;
   the electronic control further configured to deactivate the electronic alarm when the device is in a passive use state;
   the electronic control configured to calculate as a function of the detected position setting and the detected periodic pressures the interval of time remaining until the amount of gas in the gas container will reach a predetermined lower threshold, generating one or more signals causing the display to concurrently display the interval of time remaining and the detected pressure;
   the electronic control further configured to generate a signal actuating the electronic alarm when the device is in an active use state amount of gas in the gas container reaches the predetermined lower threshold.

2. A device according to claim 1 which further comprises a manually operable switch, operatively connected to the electronic control, for temporarily deactuating a signal actuating the alarm, and wherein the electronic control is further capable of calculating as a function of the detected position setting and the detected periodic pressures the interval of time remaining until the amount of gas in the container will reach each of one or more intermediate predetermined thresholds each greater than the predetermined lower threshold and generating a subsequent signal actuating the alarm when each of the one or more intermediate predetermined threshold have been reached.

3. A device according to claim 1 wherein the electronic alarm and the electronic control are embodied in a single electronic apparatus that is detachable from the device.

4. A device for controlling the flow of a gas from a gas container, comprising
   a gas flow passageway through the device and having an inlet and an outlet, wherein the inlet is configured to be sealingly attached to the gas container to receive the gas from the gas container;
   a valve in the passageway capable of controllably closing or opening the passageway to the flow of gas therethrough;
   a manually operable selector operatively connected to the valve to enable adjustment of the position of the valve to a closed position and one or more open positions by movement of the selector;
   a pressure sensor capable of detecting the pressure of the gas in the gas container when the device is sealingly attached to the gas container and of generating an electronic signal corresponding to the detected pressure;
   an electronic alarm capable of being actuated to signify the presence of an alarm state audibly, visibly, or both audibly and visibly; and
   an electronic control configured to determine whether the device is in an active use state or a passive use state based on the position setting of the valve and the pressure of the gas in the gas container;
   the electronic control further configured to deactivate the electronic alarm when the device is in a passive use state;

the electronic control configured to calculate as a function of the detected position setting and the detected periodic pressures the interval of time remaining until the amount of gas in the gas container will reach a predetermined lower threshold;

the electronic control further configured to generate a signal actuating the electronic alarm when the device is in an active use state and the amount of gas in the gas container reaches the predetermined lower threshold.

5. A device according to claim 4 further comprising an electronic control connected to the pressure sensor, which is: (1) capable of detecting the position setting of the valve; is (2) capable of repeatedly at periodic predetermined time frequencies (i) detecting from the pressure sensor the pressure of gas in the container, and (ii) calculating as a function of the detected position setting and the repeatedly detected periodic pressures the interval of time remaining until the amount of gas in the container will reach a first predetermined threshold; and is (3) capable of generating an alarm signal to actuate the electronic alarm when the amount of the gas in the gas container reaches a preset threshold which is the same as or higher than the first predetermined threshold.

6. A device according to claim 5 further comprising an electronic display that is capable of displaying information in digital and/or analog form, and that is electronically connected to the electronic control to receive the information signal and display the information corresponding to one or more states of the gas in the gas container.

7. A method for controlling the flow of a gas from a gas container, comprising the steps of:

administering the gas from the gas container via a device that is sealingly attached to the gas container to receive the gas from the gas container; the device comprises a gas flow passageway through the device, a gas flow valve disposed in the passageway and capable of controllably closing or opening the passageway to the flow of gas therethrough, a manually operable selector operatively connected to the valve to enable adjustment of the position of the valve to a closed position and one or more open positions by movement of the selector, a pressure sensor capable of detecting the pressure of the gas in the gas container, and an electronic control configured to determine whether the device is in an active use state or a passive use state based on the position setting of the valve, the pressure of the gas in the gas container;

periodically calculating during the active use state the interval of time remaining until the amount of gas in the gas container will reach a predetermined lower threshold as a function of the position setting of the valve and the detected pressure of the gas in the gas container;

displaying the interval of time remaining until the amount of gas in the gas container will reach the predetermined lower threshold on an electronic display;

concurrently displaying the detected pressure of the gas in the gas container on the electronic display in digital or analog form concurrent with the display of the interval of time remaining until the amount of gas in the gas container will reach the predetermined lower threshold; and wherein the electronic control is configured to activate an electronic alarm when the detected pressure is below the predetermined lower threshold when the device is in the active use state; and wherein the electronic control is configured to deactivate the electronic alarm when the device is in a passive use state.

* * * * *